(12) United States Patent
Kanazawa et al.

(10) Patent No.: US 12,517,313 B2
(45) Date of Patent: Jan. 6, 2026

(54) LIGHT SOURCE DEVICE

(71) Applicant: NICHIA CORPORATION, Anan (JP)

(72) Inventors: Tatsuya Kanazawa, Anan (JP); Eiichiro Okahisa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 339 days.

(21) Appl. No.: 18/042,440

(22) PCT Filed: Aug. 6, 2021

(86) PCT No.: PCT/JP2021/029325
§ 371 (c)(1),
(2) Date: Feb. 21, 2023

(87) PCT Pub. No.: WO2022/044774
PCT Pub. Date: Mar. 3, 2022

(65) Prior Publication Data
US 2023/0324633 A1    Oct. 12, 2023

(30) Foreign Application Priority Data

Aug. 26, 2020   (JP) ................................. 2020-142924

(51) Int. Cl.
*G02B 6/42*        (2006.01)
(52) U.S. Cl.
CPC ......... *G02B 6/4214* (2013.01); *G02B 6/4286* (2013.01)
(58) Field of Classification Search
CPC .............................. G02B 6/4214; G02B 6/4286
(Continued)

(56) References Cited

U.S. PATENT DOCUMENTS

2013/0027962 A1\*  1/2013  Takahashi ............. F21S 41/143
                                                                  362/538
2014/0328558 A1   11/2014  Morioka et al.
(Continued)

FOREIGN PATENT DOCUMENTS

JP     H02-253687 A    10/1990
JP     2005-045032 A    2/2005
(Continued)

OTHER PUBLICATIONS

International Search Report with English translation and Written Opinion issued in the corresponding International Patent Application No. PCT/JP2021/029325, dated Oct. 5, 2021.

*Primary Examiner* — Jerry M Blevins
(74) *Attorney, Agent, or Firm* — Foley & Lardner LLP

(57) ABSTRACT

A light source device, including: a reflective member including a plurality of reflective surfaces including a first reflective surface and a second reflective surface, and one or more transmissive surfaces including a first transmissive surface that connects between the first reflective surface and the second reflective surface; a plurality of light-emitting elements including a first light-emitting element emitting first light that travels in a direction in which the reflective member is arranged to be incident on the first reflective surface, and a second light-emitting element emitting second light that travels in a direction in which the reflective member is arranged to be incident on the second reflective surface; and a first photodetector having a first light-receiving surface on which the first light that travels in the direction in which the reflective member is arranged and is transmitted through the first transmissive surface is irradiated.

9 Claims, 5 Drawing Sheets

(58) Field of Classification Search
USPC .......................................................... 385/33
See application file for complete search history.

(56) References Cited

U.S. PATENT DOCUMENTS

| | | |
|---|---|---|
| 2014/0339403 A1 | 11/2014 | Morioka |
| 2017/0219784 A1 | 8/2017 | Morioka |
| 2020/0124956 A1* | 4/2020 | Hirasawa ............. H04N 9/3194 |

FOREIGN PATENT DOCUMENTS

| | | | | |
|---|---|---|---|---|
| JP | 2013-137507 A | | 7/2013 | |
| JP | 2014-224851 A | | 12/2014 | |
| JP | 2015-005393 A | | 1/2015 | |
| JP | 2016018594 A | * | 2/2016 | ............... F21S 2/00 |
| JP | 2016-035531 A | | 3/2016 | |
| WO | WO-2015/166810 A1 | | 11/2015 | |
| WO | WO-2018/198596 A1 | | 11/2018 | |

* cited by examiner

LIGHT SOURCE DEVICE

TECHNICAL FIELD

The present disclosure relates to a light source device.

BACKGROUND ART

Patent Document No. 1 discloses a light source device including a plurality of light sources, a stepped mirror having stepped reflective surfaces for reflecting light from the plurality of light sources, and a lens portion for condensing the reflected light. The invention disclosed in Patent Document No. 1 has an objective of providing a simple and inexpensive light source device having a stepped mirror.

CITATION LIST

Patent Literature

Patent Document No. 1: Japanese Patent Application Publication No. 2016-18594

SUMMARY OF INVENTION

Technical Problem

There is provided a light source device capable of detecting an output state of light emitted from a plurality of light sources.

Solution to Problem

A light source device according to an embodiment includes: a reflective member including a plurality of reflective surfaces including a first reflective surface and a second reflective surface, and one or more transmissive surfaces including a first transmissive surface that connects between the first reflective surface and the second reflective surface; a plurality of light-emitting elements including a first light-emitting element emitting first light that travels in a direction in which the reflective member is arranged to be incident on the first reflective surface, and a second light-emitting element emitting second light that travels in a direction in which the reflective member is arranged to be incident on the second reflective surface; and a first photodetector having a first light-receiving surface on which the first light that travels in the direction in which the reflective member is arranged and is transmitted through the first transmissive surface is irradiated.

According to an embodiment of the present disclosure, it is possible to realize a light source device capable of detecting an output state of light.

DESCRIPTION OF EMBODIMENTS

Figure 1:
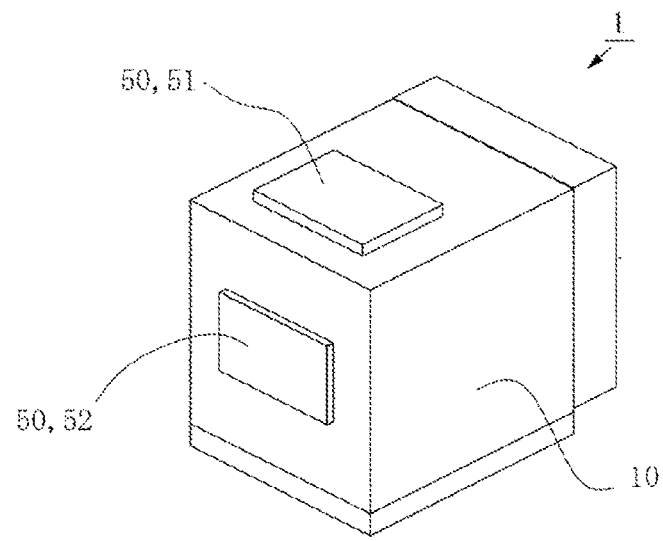
FIG. 1 is a perspective view of a light source device according to an embodiment.

For the scope of the present specification and the claims, the term "polygon" (e.g., a triangle or a rectangle) encompasses those with rounded corners, chamfered corners or beveled corners. The term "polygon" also encompasses those in which an intermediate portion of a side (as opposed to a corner, i.e., the end of the side), is deformed. That is, any shape that is obtained by partially deforming a polygon falls within the meaning of a "polygon" as defined in the present specification and the claims.

This applies not only to "polygon" but also to any term representing a particular shape such as a trapezoid, a circle or a convex/concave shape. This also applies when referring to a side of a shape. That is, even a corner or an intermediate portion of a side is deformed, the "side" is defined to include the deformed portion. Note that the term "in the strict sense" (e.g., "a rectangle in the strict sense") may be used to refer to a "polygon" or a "side" with no partial deformation, as opposed to a "polygon" or a "side" that is partially deformed.

In the present specification or the claims, where there are elements identified by a certain name and they are distinguished from one another, each element may be prefixed by an ordinal number such as "first", "second", etc. When elements with ordinal numbers appear both in the present specification and in the claims, the same ordinal number may not always refer to the same element between the specification and the claims.

For example, where there are three elements that are distinguished in the specification by the prefixes "first", "second" and "third", and the claims refer to only two of the elements, i.e., "first" and "third", from the specification, these elements may be distinguished from each other by prefixes "first" and "second", respectively. Then, the element prefixed "first" in the claims is one of the elements prefixed "first" and "third" in the specification, and the element prefixed "second" in the claims is the other one of the elements prefixed "first" and "third" in the specification.

In the present specification or the claims, terms indicating particular directions or positions (e.g., "up", "down", "right," "left", "front", "back", and other terms including these terms) may be used. Those terms are used merely for clarity of relative orientation or position in the referenced drawings. As long as the relative direction or position relationship by terms such as "up", "down", etc., in the referenced drawings is the same, the arrangement in drawings other than the present disclosure, actual products, manufacturing apparatuses, etc., may not be identical to that in the referenced drawings.

Embodiments of the present invention will now be described with reference to the drawings. Note however that the illustrated embodiments embody the technical concept of the present invention but are not intended to limit the scope of the present invention. In the following description, like reference signs denote like elements, and redundant descriptions may be omitted. Note that the size, relative arrangement, etc., of the members shown in the figures may be exaggerated for ease of understanding.

Embodiment

Figure 2:
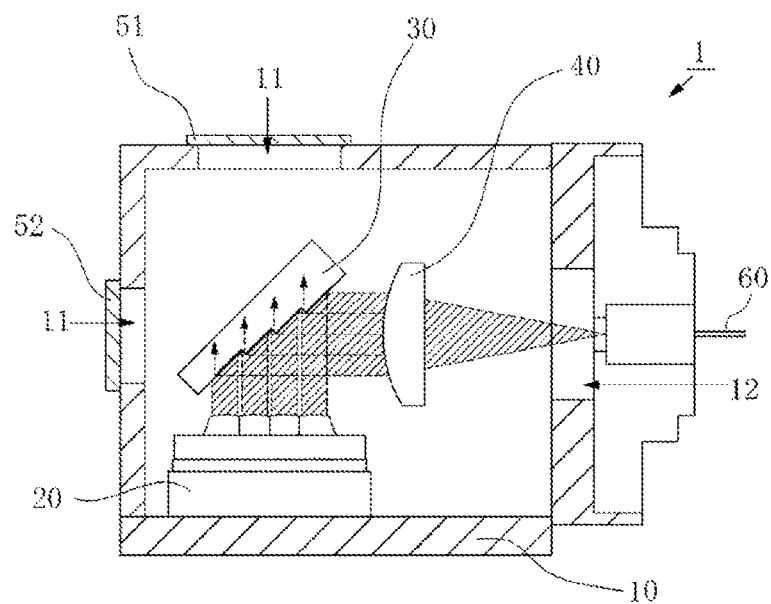
FIG. 2 is a schematic diagram illustrating components arranged inside a housing of the light source device according to an embodiment, and the optical path of the emitted light.
Figure 3:
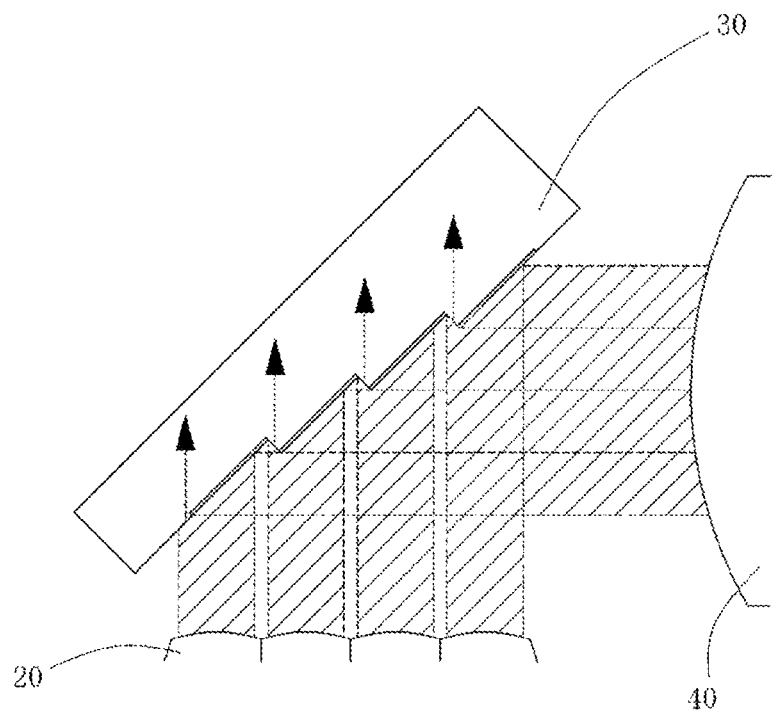
FIG. 3 is an enlarged view illustrating the optical action by the reflective member in the light source device according to an embodiment.
Figure 4:
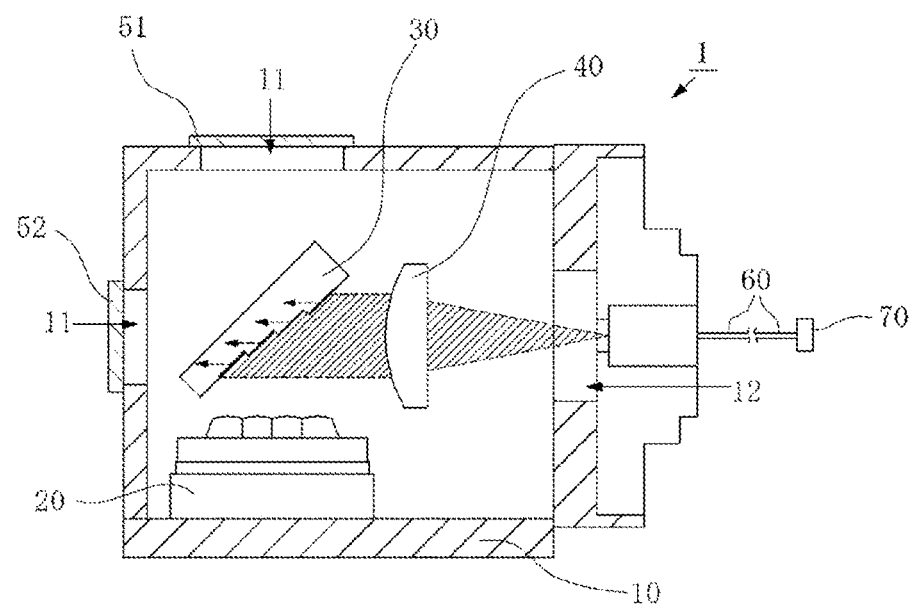
FIG. 4 is a schematic diagram illustrating the optical path of return light inside a housing of the light source device according to an embodiment.

A light source device 1 according to an embodiment will be described. FIG. 1 to FIG. 9 are drawings illustrating an illustrative embodiment of the light source device 1. FIG. 1 is a perspective view of the light source device 1. FIG. 2 is a schematic diagram illustrating components arranged in the internal space of a housing 10 of the light source device 1. The hatched area shows light emitted from a light-emitting device 20. FIG. 3 is an enlarged view of the portion of a reflective member 30 in conjunction with the optical action of the emitted light shown in FIG. 2. FIG. 4 is a schematic diagram illustrating the optical path of return light in the internal space of a housing 10. The hatched area shows return light.

Figure 5:
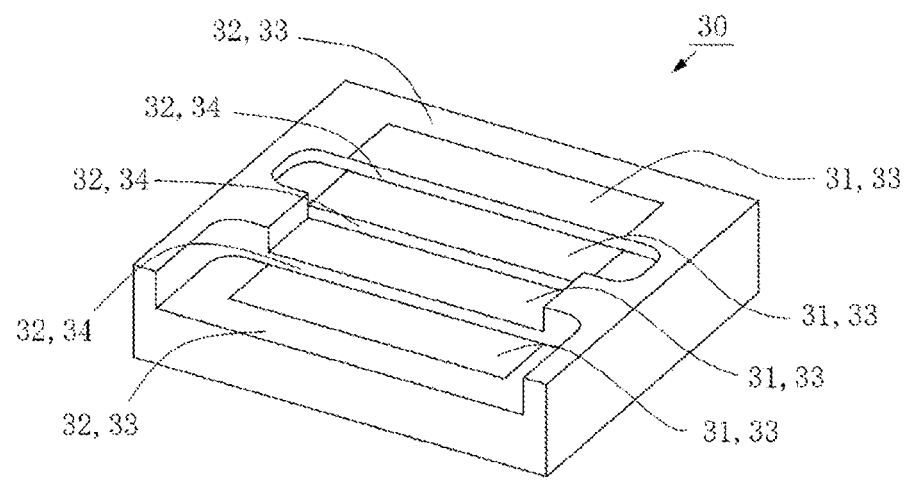
FIG. 5 is a perspective view of the reflective member according to an embodiment.
Figure 6:
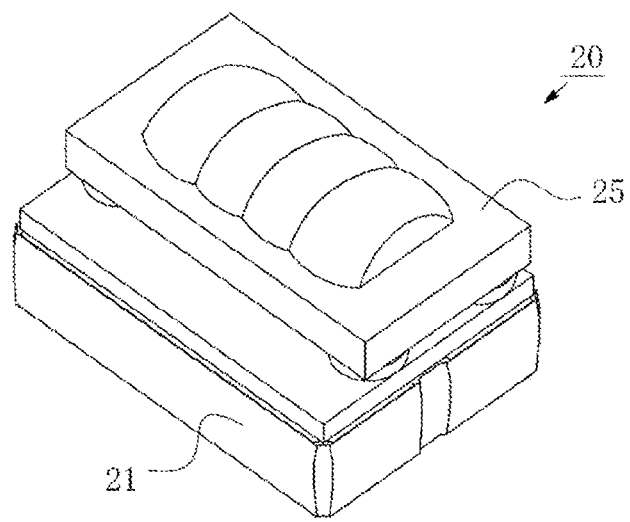
FIG. 6 is a perspective view of a light-emitting device according to an embodiment.
Figure 7:
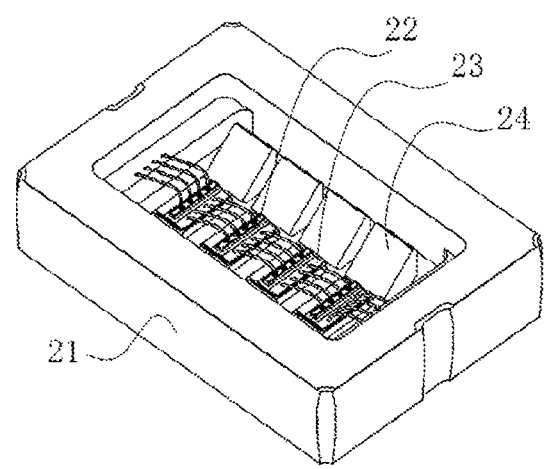
FIG. 7 is a perspective view illustrating components arranged inside a package of the light-emitting device according to an embodiment.
Figure 8:
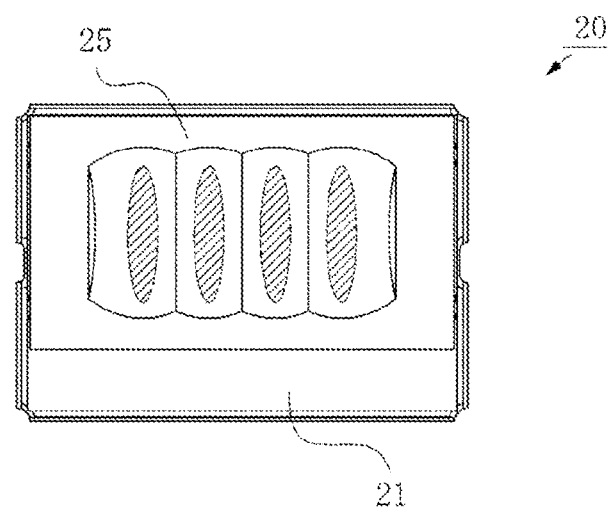
FIG. 8 is a top view of the light-emitting device according to an embodiment.
Figure 9:
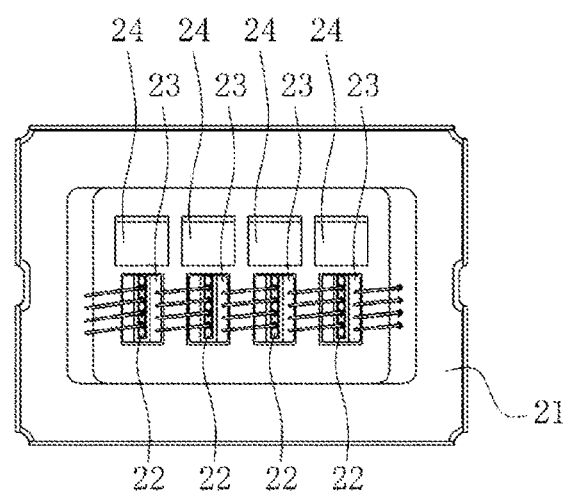
FIG. 9 is a top view illustrating components arranged inside the package of the light-emitting device according to an embodiment.

FIG. 5 is a perspective view of the reflective member 30. FIG. 6 is a perspective view of the light-emitting device 20. FIG. 7 is a perspective view of one or more components arranged in the internal space of the package 21 of the light-emitting device 20. FIG. 8 is a top view of the light-emitting device 20. The hatched area shows light emitted from the light-emitting device 20. FIG. 9 is a top view of the perspective view of FIG. 7 as viewed from above.

The light source device 1 has a plurality of components including a housing 10, one or more light-emitting devices 20, the reflective member 30, a condenser lens 40, one or more photodetectors 50 and an optical fiber 60. Note that it may have additional components that are different from these, or may have additional components that are the same.

First, the components will be described.

(Housing 10)

The housing 10 has a bottom surface, one or more lateral surfaces, and an upper surface located above the bottom surface. The housing 10 forms an internal space enclosed by the bottom surface, one or more lateral surfaces, and the upper surface. Other components can be arranged in this internal space.

The housing 10 also has one or more openings 11 formed therein. For example, an opening 11 is formed in the upper surface of the housing 10. For example, an opening 11 is also formed on a lateral surface of the housing 10. In the illustrated light source device 1, openings 11 are formed on the upper surface and a lateral surface of the housing 10. The housing 10 is also formed with an exit port 12 that allows the primary light to be emitted to the outside of the housing 10. For example, the exit port 12 is formed on a lateral surface of the housing 10.

The opening 11 provided in the upper surface is formed at a position closer to an opposite lateral surface than the lateral surface on which the exit port 12 is formed. The exit port 12 can be formed on the lateral surface opposite to the lateral surface on which the opening 11 is formed. The opening 11 and the exit port 12 formed on lateral surfaces are located at respective positions such that a virtual straight line parallel to the bottom surface of the housing 10 passes through them.

(Light-Emitting Device 20)

The light-emitting device 20 has a plurality of components including the package 21, one or more light-emitting elements 22, one or more submounts 23, one or more reflective members 24 and one or more collimating lenses 25. Here, for the purpose of distinction, the reflective members 30 are referred to as the first reflective members 30 and the reflective members 24 as the second reflective members 24, although they can be distinguished by reference signs.

A sealed space in which other components of the light-emitting device 20 are arranged is formed in the package 21. The package 21 can be formed by, for example, a base that defines a recessed portion and a lid portion that covers the recessed portion. One or more light-emitting elements 22 are arranged in the sealed space formed inside the package 21. In addition, one or more second reflective members 24 may be arranged. The one or more light-emitting elements 22 may be mounted on the one or more submounts 23.

The light-emitting element 22 is a semiconductor laser element. Note that the light-emitting element 22 is not limited to a semiconductor laser element, but may also be a light-emitting diode, or the like. When the light-emitting element 22 is a semiconductor laser element, the space inside the package 21 can be sealed airtight. This can prevent light quality deterioration due to collection of dust.

The light-emitting element 22 is arranged on the bottom surface of the package 21 and emits light to the side. Therefore, the light output surface of the light-emitting element 22 is located on the lateral surface. Note that the light output surface may be located on the upper surface so that light is emitted upward. The light output surfaces may be located on multiple surfaces of the light-emitting element 22.

The arrangement is such that the largest surface of the light-emitting element 22 is located on the upper surface or the lower surface. When the light-emitting element 22 is a semiconductor laser element, such an arrangement can be achieved by providing the output surface on a lateral surface. This makes it easier for heat generated from the light-emitting element 22 to be dissipated through the package 21. The heat dissipation can also be further improved by sandwiching the submount 23 therebetween.

Light output from the output surface of the light-emitting element 22 is irradiated on the reflective surface of the second reflective member 24. Light reflected by the second reflective member 24 travels upward to be emitted to the outside of the package 21. Light emitted to the outside of the package 21 passes through the collimating lens 25 to become collimated light to be emitted to the outside of the light-emitting device 20.

One or more collimating lenses 25 are arranged above the package 21. One or more collimating lenses 25 are fixed to the package 21. The collimating lens 25 has lens surfaces for converting the incident light into collimated light. One or more collimating lenses 25 are designed so that one lens surface collimates light from one light-emitting element 22. Where the collimating lens 25 collimates light from multiple light-emitting elements 22, there will also be multiple lens surfaces. Note that the light-emitting device 20 does not need to have the collimating lens 25. For example, the collimating lens 25 may be provided in the light source device 1 as a component separate from the light-emitting device 20, rather than as a part component of the light-emitting device 20.

The light-emitting device 20 shown in the figures illustrates a configuration with a plurality of light-emitting elements 22, a plurality of submounts 23, a plurality of second reflective members 24 and one collimating lens 25. The plurality of light-emitting elements 22 are arranged side-by-side, and the plurality of second reflective members 24 are also arranged side-by-side in the same direction as the plurality of light-emitting elements 22 are arranged. Similarly, the plurality of lens surfaces of the collimating lens 25 are also arranged side-by-side in the same direction. As a result, a plurality of collimated light are emitted side-by-side from the light-emitting device 20.

(Light-Emitting Element 22)

Description of the semiconductor laser element, which is an example of the light-emitting element 22, will now be supplemented. The light (laser light) emitted from the semiconductor laser element has a spread and forms an elliptical far-field pattern (hereinafter referred to as "FFP") on a surface parallel to the light output face. The FFP is the shape and light intensity distribution of the output light at a position away from the output face.

The light passing through the center of the elliptical shape of the FFP, in other words, light that has the peak intensity in the light intensity distribution of the FFP, will be referred to as light traveling along the optical axis. The optical path of the light traveling along the optical axis is called the optical axis of the light. In the light intensity distribution of the FFP, the light with an intensity of $1/e^2$ or more of the peak intensity value will be referred to as the primary part light.

In the elliptical shape of the FFP of the light emitted from the semiconductor laser element, the short diameter direction of the ellipse will be referred to as the slow axis direction of the FFP and the long diameter direction will be referred to as the fast axis direction of the FFP. A plurality of layers, including an active layer, comprising a semiconductor laser element are stacked in the fast-axis direction of the FFP.

Based on the light intensity distribution of the FFP, the angle corresponding to the primary part light will be referred to as the spread angle of light of the semiconductor laser element. In an elliptically shaped FFP, the spread angle of light in the fast axis direction is larger than the spread angle of light in the slow axis direction.

(First Reflective Member 30)

The first reflective member 30 has a plurality of reflective surfaces 31. The plurality of reflective surfaces 31 are not on the same plane and are parallel to each other. The plurality of reflective surfaces 31 are provided on the same side of the first reflective member 30. The plurality of reflective surfaces 31 are located so that they do not overlap with each other as viewed from above from a direction perpendicular to the plane parallel to the reflective surface 31. The plurality of reflective surfaces 31 may partially overlap.

Outline of the first reflective member 30 has a stepped shape, and the reflective surface 31 is formed at each of successive steps. The first reflective member 30 has a transmissive surface 32 that is continuous from the reflective surface 31. One or more transmissive surfaces 32 are formed on the first reflective member 30.

In the stepped portion of the first reflective member 30, the plurality of reflective surfaces 31 and the one or more transmissive surfaces 32 alternate with each other. The one or more transmissive surfaces 32 include transmissive surfaces 32 connecting two reflective surfaces 31. This transmissive surface 32 is continuous with both of two reflective surfaces 31. Further, the first reflective member 30 may have a plurality of transmissive surfaces 32, and the plurality of transmissive surfaces 32 may include a transmissive surface 32 that is continuous from a reflective surface 31 on the same plane as the reflective surface 31.

Here, the plurality of planes forming stair-like steps in the first reflective member 30 will be referred to as step surfaces. It can be said that the first reflective member 30 includes a plurality of step surfaces forming steps. Where one of the successive steps is a lower step and the other is an upper step, the plurality of step surfaces include at least the upper surface of the lower step, the upper surface of the upper step, and a lateral surface that intersects both of the upper surfaces.

Also, an upper surface of a stepped surface will be referred to as a step upper surface 33 and a lateral surface will be referred to as a step lateral surface 34. In order to form stair-like steps, two or more step upper surfaces 33 and one or more step lateral surfaces 34 are required. The step lateral surface 34 intersects the step upper surfaces 33 of both of the successive steps. The step upper surface 33 and the step lateral surface 34 intersect each other perpendicularly. Note that being perpendicular as used herein includes a difference within ±2 degrees.

The first reflective member 30 has a bottom surface located on the opposite side of the step upper surface 33. Stepped surfaces form a stair-like shape with respect to the bottom surface. It also includes an outer lateral surface that intersects the step upper surface 33 of the uppermost step on the opposite side from the step lateral surface 34 that intersects this step upper surface 33, and an outer lateral surface that intersects the step upper surface 33 of the lowermost step on the opposite side from the step lateral surface 34 that intersects the step upper surface 33. The plurality of step surfaces are between these two outer lateral surfaces.

The plurality of reflective surfaces 31 are provided on the plurality of step upper surfaces 33. A reflective surface 31 is provided on the step upper surface 33 of each of the successive steps. Each of the step lateral surface 34 is a transmissive surface 32 that allows light to pass therethrough. For example, the first reflective member 30 having the reflective surfaces 31 and the transmissive surfaces 32 can be made by providing reflective surfaces 31 on portions of the entire surface of a light-transmissive base material that forms the general shape (the primary shape). For example, the reflective surface 31 is formed by a dielectric multilayer film. The reflective surface 31 is formed on part or whole of the step upper surface 33. The transmitting surface 32 is formed on part or whole of the step lateral surface 34.

Note that the reflective surface 31 has a reflectance of 90% or more for light having a specific wavelength. Preferably, the reflectance is 95% or more. More preferably, the reflectance is 99% or more. When the light reflected by the reflective surface 31 is the primary output light of the light source device 1, the higher the reflectance, the more light can be captured. On the other hand, if transmitted light is needed in addition to the light passing through the transmissive surface 32, the reflectance of the reflective surface 31 can be reduced so as to use light passing through the reflective surface. The higher the reflectivity of the reflective surface 31, the more preferable it is, but the reflectance may be set appropriately, taking into account the balance of light that is desired to be used as transmitted light, and the numerical conditions for reflectance described above are at least those that are considered useful.

The transmissive surface 32 has a greater transmittance for light of the same specific wavelength than the transmittance at the reflective surface 31. As a specific example, the transmissive surface 32 has a transmittance for light of the same specific wavelength that is 20% or more greater than the transmittance at the reflective surface 31. The transmissive surface 32 can have a transmittance of 50% or more for light of the same specific wavelength.

Note that in the process of providing the reflective surface 31 on the step upper surface 33, part of the material used to form the reflective surface 31 may also be formed on the step lateral surface 34. Even in such a case, the step lateral surface 34 of the first reflective member 30 does not have a reflective surface having generally the same reflective property as the reflective surface 31 of the step upper surface 33, and can transmit light more than the reflective surface 31. That is, it can be said that the first reflective member 30 can transmit more light as compared with a reflective member that has the same external shape where the reflective surface 31 is provided entirely on the step upper surface 33 and the step lateral surface 34.

Here, the direction in which the steps are formed will be referred to as the step direction. For example, the step direction on the step upper surface 33 is the direction in which the step lateral surface 34 that intersects this step upper surface 33 is reached in the shortest distance. The step direction on step lateral surface 34 is the direction in which the step upper surface 33 that intersects this step lateral surface 34 is reached in the shortest distance. In the illustrated example of the light source device 1, the step direction on the step upper surface 33 is a direction that is on a plane parallel to the step upper surface 33 and that is perpendicular to the line of intersection between the step upper surface 33 and the step lateral surface 34, and the step direction on the step lateral surface 34 is a direction that is on a plane parallel to the step lateral surface 34 and that is perpendicular to the line of intersection between the step upper surface 33 and the step lateral surface 34.

The length of the reflective surface 31 in the step direction is larger than the length of the transmissive surface 32 in the step direction. The length of the transmissive surface 32 in the step direction is less than or equal to ⅓ of the length of the reflective surface 31 in the step direction. The length of the step upper surface 33 in the step direction is greater than the length in the step direction of the step lateral surface 34 that intersects this step upper surface 33. The length of the step upper surface 33 in the step direction is three times or more the length in the step direction of the step lateral surface 34 that intersects this step upper surface 33.

(Condenser Lens 40)

The condenser lens 40 is a lens to condense the incident light into a predetermined point or area. The condenser lens 40 is, for example, a plano-convex lens.

(Photodetector 50)

A photodetector 50 has a light-receiving surface that receives light. The light-receiving surface is provided on the surface of the photodetector 50. The photodetector 50 is a photoelectric conversion element that outputs an electrical signal according to the intensity or the amount of light incident on the light-receiving surface. The photodetector 50 is, for example, a photodiode.

(Optical Fiber 60)

The optical fiber 60 has a fiber that connects together the input port and the exit port. Light entering from the input port propagates inside the fiber and is emitted from the exit port. The optical fiber 60 has a core diameter of 400 μm or less at the input port, for example. The diameter of the core at the input port is preferably 200 μm or less. If the diameter of the core can be reduced, it is possible to reduce the size of the light source device 1 or the entire composite apparatus including other devices connected to the light source device 1.

(Light Source Device 1)

Next, the light source device 1 will be described. In the light source device 1, one or more light-emitting devices 20 are arranged in the internal space of the housing 10. The light-emitting device 20 is arranged on the bottom surface of the housing 10. The light-emitting device 20 is arranged so that the collimating lens 25 faces toward the upper surface of the housing 10. The light-emitting device 20 emits light upward. Collimated light is emitted upward.

Light emitted from one or more light-emitting devices 20 includes light emitted from a plurality of light-emitting elements 22. Light emitted from a plurality of light-emitting elements 22 are emitted upward with their optical axes parallel to each other. Note that being parallel as used herein includes a difference within ±2 degrees. Light emitted from a plurality of light-emitting elements 22 are emitted upward, aligned in the slow axis direction.

As viewed from above, at least a portion of the one or more light-emitting devices 20 is included in the opening 11 provided in the upper surface of the housing 10. As viewed from the side, the one or more light-emitting devices 20 are not included in the opening 11 provided in the lateral surface of the housing 10. That is, the one or more light-emitting devices 20 are arranged at positions lower than the opening 11 provided in the lateral surface of the housing 10. In other words, the opening 11 provided in the lateral surface of the housing 10 is formed at a position higher than the one or more light-emitting devices 20.

In the light source device 1, the first reflective member 30 is arranged in the internal space of the housing 10. The first reflective member 30 is arranged above the one or more light-emitting devices 20. Light emitted from the light-emitting device 20 travels in the direction in which the first reflective member 30 is arranged. The light output from the light-emitting devices 20 is reflected by the reflective surface 31 of the first reflective member 30. A portion of light emitted from the light-emitting device 20 is transmitted through the transmissive surface 32 of the first reflective member 30.

In the light source device 1, the condition of reflectance at the reflective surface 31 of the first reflective member 30 and the condition of transmittance at the transmissive surface 32 hold true when the light emitted from the light-emitting element 22 or peak wavelength light of the light emitted from the light-emitting element 22 is light of a specific wavelength.

In the light source device 1, a plurality of light emitted from the plurality of light-emitting elements 22 are irradiated on the plurality of reflective surfaces 31 and reflected by the plurality of reflective surfaces 31. The plurality of light-emitting elements 22 include one or more light-emitting elements 22 whose output light is incident on the reflective surface 31 and the transmissive surface 32. Light emitted from the plurality of light-emitting elements 22 and traveling along the optical axis are irradiated on different reflective surfaces 31.

The first reflective member 30 is arranged such that the reflective surface 31 is inclined to be slant relative to the optical axis of light traveling toward the reflective surface 31. The light reflected by the reflective surface 31 travels in the direction of the lateral surface on which the exit port 12 is formed.

The distance between the optical axes of light emitted from a plurality of light-emitting elements 22 is shorter at a point where the light reflected by the first reflective member 30 travels than at a point where light travels toward the direction where the first reflective member 30 is arranged. That is, the optical axes can be brought closer to each other by reflecting the light by the stair-like first reflective member 30. This allows light from the plurality of light-emitting elements 22 to be collected in a smaller area. Note that from this perspective, the length of the step lateral surface 34 in the step direction is preferably small, and the length of the transmissive surface 32 in the step direction is also preferably smaller than the length of the reflective surface 31 in the step direction.

Light irradiated on the transmissive surface 32 passes through the transmissive surface 32 and is emitted from the bottom surface of the first reflective member 30. Light emitted from the bottom surface of the first reflective member 30 travels upward. Note that light emitted from the outer lateral surface of the first reflective member 30 may be included.

The number of stair-like steps in the first reflective member 30 is one less than the number of reflective surfaces 31 of the first reflective member 30 on which light emitted from the one or more light-emitting elements 22 are irradiated. The number of reflective surfaces 31 in the first reflective member 30 is the same as the number of light-emitting elements 22 that emit light to be irradiated on the reflective surfaces 31 of the first reflective member 30.

In the example of the light source device 1 illustrated in the figures, all the light emitted from one or more light-emitting devices 20 are incident on the reflective surface 31 and the transmissive surface 32 of the first reflective member 30. The reflective surface 31 is inclined at 45 degrees relative to the optical axis of light traveling toward this reflective surface 31. The reflective surface 31 is provided on each of the four steps of the first reflective member 30.

In the light source device 1, the photodetector 50 is arranged further above the first reflective member 30. The photodetector 50 is arranged on the upper surface of the housing 10 so as to close the opening 11 provided in the upper surface of the housing 10, for example.

In the light source device 1, another photodetector 50 is arranged sideward of the first reflective member 30. For example, the photodetector 50 is arranged on the lateral surface of the housing 10 so as to block the opening 11 provided in the lateral surface of the housing 10. Note that the light source device 1 may be configured so that the photodetector 50 is arranged only above or sideward of the first reflective member 30.

Here, in order to distinguish between these photodetectors 50, the photodetector 50 arranged further above the first reflective member 30 will be referred to as a first photodetector 51 and the photodetector 50 arranged on the lateral surface of the housing 10 as a second photodetector 52.

The first photodetector 51 is provided at such a position that light emitted from the light-emitting element 22 passes through the first reflective member 30 and reaches the light-receiving surface of the first photodetector 51. The first photodetector 51 is provided at such a position that a virtual straight line passing through the optical axis of light emitted from the light-emitting element 22 and travelling in the direction in which the first reflective member 30 is arranged passes through. The second photodetector 52 is provided at a position through which this straight line does not pass.

The second photodetector 52 is provided at such a position that return light to be described below passes through the first light reflective member 30 to reach the light-receiving surface of the first photodetector 51. The second photodetector 52 is provided at such a position that a virtual straight line passing through the optical axis of light emitted from the light-emitting element 22 and reflected by the first reflective member 30 passes through. The first photodetector 51 is provided at a position through which this straight line does not pass.

The light-receiving surface of the first photodetector 51 is irradiated with light that is emitted upward from one or more light-emitting devices 20, travels in the direction in which the first reflective member 30 is located, and passes through the transmissive surface 32. The light-receiving surface of the first photodetector 51 is irradiated with light that is emitted from the plurality of light-emitting elements 22 and passes through the transmissive surface 32. This light is detected by the light-receiving surface of the first photodetector 51 to detect the output state of light emitted from the light-emitting device 20 or the light-emitting element 22. For example, it is possible to quickly know that the output of light emitted from the light source device 1 has decreased due to a failure of some of the plurality of light-emitting elements 22.

In the light source device 1, the condenser lens 40 is arranged in the internal space of the housing 10. The condenser lens 40 is arranged sideward of the first light reflective member 30. The condenser lens 40 is arranged between the light reflective member 30 and the exit port 12. A plurality of light emitted from the plurality of light-emitting elements 22 and reflected by the first reflective member 30 pass through the condenser lens 40 to be condensed toward the exit port 12.

In the light source device 1, the optical fiber 60 is arranged sideward of the condenser lens 40. The optical fiber 60 is attached to the exit port 12 of the housing 10, for example. A plurality of light reflected by the first reflective member 30 and having passed through the condenser lens 40 enter the optical fiber 60. The light having entered through the input port of the optical fiber 60 propagates in the fiber to be emitted from the exit port.

For example, light emitted from the exit port of the optical fiber 60 is incident on the wavelength conversion member 70, and the light wavelength-converted by the wavelength conversion member 70 is emitted. The wavelength conversion member 70 can be connected to the optical fiber 60 and be one component of the light source device 1, as illustrated in FIG. 4. In this case, a portion of the wavelength-converted light may enter through the exit port of the optical fiber 60 and be emitted through the input port of the optical fiber 60 into the internal space of the housing 10. The light entering the internal space from outside the housing 10 as illustrated here will be referred to as return light.

The light source device 1 can receive this returned light by the second photodetector 52. In this case, for example, the reflective surface 31 of the first reflective member 30 reflects light emitted from the light-emitting element 22, while the wavelength-converted light is transmitted therethrough. With such a reflective surface 31, return light that enters the first reflective member 30 is transmitted through the reflective surface 31 and the transmissive surface 32. The light-receiving surface of the second photodetector 52 is irradiated with at least a portion of return light having passed through the reflective surface 31 and the transmissive surface 32. By detecting this light on the light-receiving surface of the second photodetector 52, it is possible to detect the output state of light that has been wavelength-converted by the wavelength conversion member 70. For example, with a decrease in the received light, it is possible to quickly know that the wavelength conversion member 70 is no longer functioning sufficiently due to damage or the like. As the opening 11 provided on the lateral surface of the housing 10 is formed at a position higher than the one or more light-emitting devices 20, it is possible to effectively receive the return light.

For example, the plurality of light-emitting elements 22 may emit blue light, which can be mixed with light wavelength-converted by the wavelength conversion member 70, thereby emitting white light. In order to emit such mixed color, the balance between the light emitted by the light-emitting elements 22 and the wavelength-converted light can be an important factor for maintaining quality. In the example of the light source device 1 illustrated in the figures, it can be used not only to detect whether a malfunction or a damage has occurred in the light-emitting elements 22 and the wavelength conversion member 70 but also to adjust the balance of the amount of light with a high precision.

Note that blue light refers to light whose emission peak wavelength is in the range of 420 nm to 494 nm. Examples of a light-emitting element that emits blue light include a light-emitting element that contains a nitride semiconductor. For example, GaN, InGaN and AlGaN can be used as a nitride semiconductor.

The optical action of light will now be described based on two light-emitting elements 22 included in the plurality of light-emitting elements 22 provided in the light source device 1. Here, the two light-emitting elements 22 are referred to as the first light-emitting element and the second light-emitting element, respectively.

The plurality of reflective surfaces 31 of the first reflective member 30 include a first reflective surface on which light emitted from the first light-emitting element (first light) is incident, and a second reflective surface on which light emitted from the second light-emitting element (second light) is incident. The first reflective surface and the second reflective surface can be reflective surfaces provided on the step upper surfaces 33 of successive steps, respectively.

The first reflective member 30 has the first reflective surface, the second reflective surface, and the transmissive surface 32 (which will be referred to as the first transmissive surface) connecting the first reflective surface and the second reflective surface. At least first light of the first light and the second light is transmitted through the first transmissive surface and irradiated on the light-receiving surface of the first photodetector 51.

The second light is transmitted through the transmissive surface 32 (which will be referred to as the second transmissive surface), which is opposite to the first transmissive surface and continuous from the second reflective surface, and is irradiated on the light-receiving surface of the first photodetector 51. The second transmissive surface is formed on the step lateral surface 34 or on the same plane as the second reflective surface.

The optical axis of the first light and the optical axis of the second light travelling in the direction in which the first reflective member 30 is arranged extend parallel to each other while keeping a predetermined distance therebetween. Where this predetermined distance is the first distance, the optical axis of the first light reflected by the first reflective surface and the optical axis of the second light reflected by the second reflective surface extend parallel to each other while keeping a distance (which will be referred to as the second distance) shorter than the first distance. That is, the second distance is smaller than the first distance.

Note that while the stepped first reflective member 30 has been described as an example, the present disclose is not limited thereto. For example, a plurality of reflective members may be used to realize a similar arrangement to the plurality of reflective surfaces 31 of the first reflective member 30. That is, the light source device 1 may be said to include one or more reflective members 30 as will be described below.

The one or more reflective members 30 have a plurality of reflective surfaces including the first reflective surface and the second reflective surface. The plurality of reflective surfaces may be planes that are parallel to each other and displaced in the direction perpendicular to the planes. Moreover, there is a transmissive region provided between the first reflective surface and the second reflective surface. There is a transmissive region between two reflective surfaces of the plurality of reflective surfaces that satisfy the relationship that no other reflective surface exists between two planes parallel to the respective reflective surfaces. Thus, there exists one or more transmissive region in relation to the plurality of reflective surfaces.

As compared with at least one of two reflective surfaces that are associated with one or more transmissive region, the one or more transmissive region has a higher transmittance for light irradiated on this reflective surface. As compared with either one of two reflective surfaces that are associated with one or more transmissive region, the one or more transmissive region has a higher transmittance for light irradiated on the two reflective surface. Note that the upper limit of transmittance here can may include 100%. For example, a transmissive region with no blockage so that light travels straight therethrough can be said to have a transmittance of 100%.

The transmissive region provided between the first reflective surface and the second reflective surface may exist between a virtual plane (the first virtual plane) that is parallel to the optical axis of light irradiated on the first reflective surface and that passes through a side of the first reflective surface that is closest to the second reflective surface, and a virtual plane (the second virtual plane) that is parallel to the optical axis of light irradiated on the first reflective surface and that passes through a side of the second reflective surface that is closest to the first reflective surface. This similarly holds true also for a transmissive region other than the transmissive region provided between the first reflective surface and the second reflective surface, in relation to the transmissive region and the two reflective surfaces that are associated with the transmissive region.

While an embodiment of the present invention has been described above, the light source device of the present invention is not strictly limited to the light source device of the embodiment. That is, the present invention can be embodied without limitation to the outer shape and the structure of the light source device disclosed by the embodiment above. It is also not required that all of the components be provided sufficiently. For example, where a claim does not recite some of the components of the light source device disclosed by the embodiment above, the claimed invention is applicable with some degree of design freedom allowed for a person of ordinary skill in the art to make replacement, omission, change in shape, change in material for those unrecited components.

INDUSTRIAL APPLICABILITY

The light-emitting devices described above are applicable to lighting fixtures, projectors, headlights for vehicles, head mounted displays, displays, etc.

REFERENCE SIGNS LIST 1 light source device
10 housing 11 opening
12 exit port
20 light-emitting device
21 package
22 light-emitting element
23 sub-mount
24 reflective member
25 collimating lens
30 reflective member
31 reflective surface
32 transmissive surface
33 step upper surface
34 step lateral surface
40 condenser lens
50 photodetector
51 first photodetector
52 second photodetector
60 optical fiber
70 wavelength conversion member

The invention claimed is:

1. A light source device, comprising:
a reflective member including a plurality of reflective surfaces including a first reflective surface and a second reflective surface, and one or more transmissive surfaces including a first transmissive surface that connects between the first reflective surface and the second reflective surface;
a plurality of light-emitting elements including a first light-emitting element emitting first light that travels in a direction in which the reflective member is arranged to be incident on the first reflective surface, and a second light-emitting element emitting second light that travels in a direction in which the reflective member is arranged to be incident on the second reflective surface; and
a first photodetector having a first light-receiving surface on which the first light that travels in the direction in which the reflective member is arranged and is transmitted through the first transmissive surface is irradiated,
wherein the reflective member is immovably fixed relative to the plurality of light-emitting elements and the first photodetector.

2. The light source device according to claim 1, wherein an optical axis of the first light and an optical axis of the second light extend parallel to each other while keeping a first distance therebetween, and an optical axis of the first light having been reflected by the first reflective surface and an optical axis of the second light having been reflected by the second reflective surface extend parallel to each other while keeping a second distance therebetween that is shorter than the first distance.

3. The light source device according to claim 1, further comprising one or more collimating lenses configured to collimate a plurality of light emitted from the plurality of light-emitting elements including the first light and the second light, wherein the plurality of collimated light are incident on the plurality of reflective surfaces.

4. The light source device according to claim 1, further comprising a second photodetector having a second light-receiving surface, wherein:
the first photodetector is provided at a position through which a first straight line passes, the first straight line being a virtual straight line passing through the optical axis of the first light travelling in the direction in which the reflective member is arranged, and
the second photodetector is provided at a position through which a second straight line passes, the second straight line being a virtual straight line passing through the optical axis of the first light having been reflected by the reflective member.

5. The light source device according to claim 4, wherein:
the first photodetector is provided at a position through which the second straight line does not pass; and
the second photodetector is provided at a position through which the first straight line does not pass.

6. The light source device according to claim 1, further comprising:
a condenser lens configured to condense a plurality of light emitted from the plurality of light-emitting elements and reflected by the reflective member; and
an optical fiber configured to receive the plurality of light having been condensed by the condenser lens.

7. The light source device according to claim 6, further comprising a wavelength conversion member configured to convert a wavelength of the plurality of light received by the optical fiber.

8. The light source device according to claim 1, wherein the reflective member has a stair-like shape including the plurality of reflective surfaces and the one or more transmissive surfaces alternating with each other.

9. A light source device comprising:
one or more reflective members having a plurality of reflective surfaces including a first reflective surface and a second reflective surface;
a plurality of light-emitting elements including a first light-emitting element emitting first light that travels in a direction in which the reflective member is arranged to be incident on the first reflective surface, and a second light-emitting element emitting second light that travels in a direction in which the reflective member is arranged to be incident on the second reflective surface; and
a first photodetector having a first light-receiving surface on which the first light that travels in the direction in which the reflective member is arranged and is transmitted through a transmissive region that is present between the first reflective surface and the second reflective surface and that transmits the first light more than the first reflective surface is irradiated,
wherein the one or more reflective members are immovably fixed relative to the plurality of light emitting elements and the first photodetector.

* * * * *